L. W. OTT.

BED LOUNGE.

No. 10,260. Reissued Dec. 19. 1882.

WITNESSES.

Jacob W. Loeper

W. P. Smith

INVENTOR.

L. W. Ott

By C. P. Jacobs atty.

N. PETERS, Photo-Lithographer, Washington, D. C.

UNITED STATES PATENT OFFICE.

LOUIS W. OTT, OF INDIANAPOLIS, INDIANA.

BED-LOUNGE.

SPECIFICATION forming part of Reissued Letters Patent No. 10,260, dated December 19, 1882.

Original No. 219,010, dated August 26, 1879. Application for reissue filed October 21, 1882.

*To all whom it may concern:*

Be it known that I, LOUIS W. OTT, of Indianapolis, Marion county, Indiana, have invented a new and Improved Bed-Lounge, of which the following is a specification.

Figure 1:
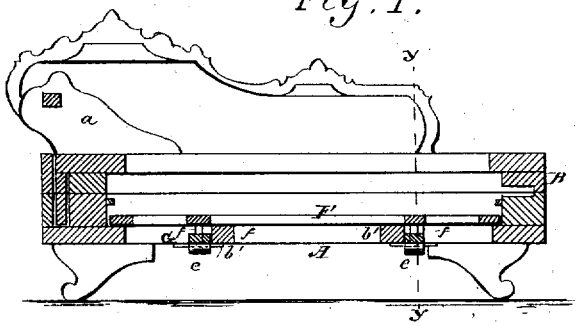
Figure 2:
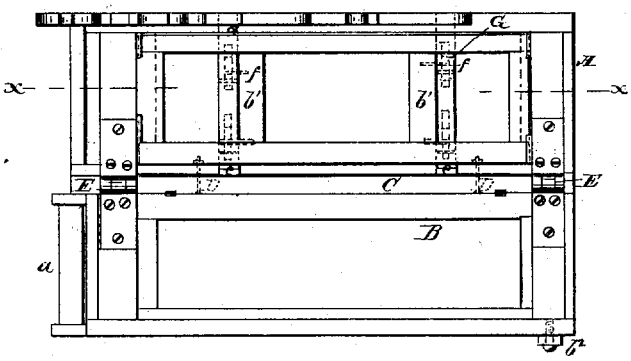
Figure 3:
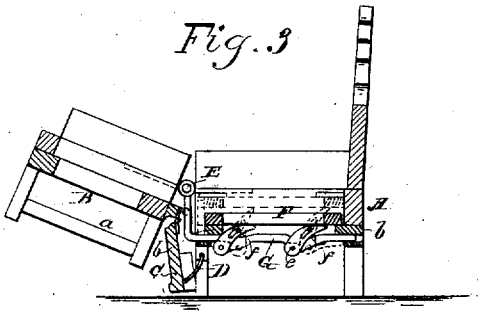

Figure 1 is a longitudinal section of my improved lounge, taken on the line *x x* in Fig. 2. Fig. 2 is a plan view, showing the bed-lounge opened. Fig. 3 is a transverse section taken on line *y y* in Fig. 1.

Similar letters of reference indicate corresponding parts.

My invention relates to bed-lounges that form a lounge or couch when closed, and when opened form a bed; and it consists in a movable front piece hinged to the upper portion of the bottom and connected by a link with the lower portion, so that as the upper portion of the bottom is turned on its hinges the front piece is carried with it and drops down out of the way.

It also consists in a movable frame supported in the main frame in cams that are pivoted to sliding bars that are operated by the opening of the lounge so as to raise the movable frame into the plane of the hinged portion. The object of this arrangement is to provide a space for containing the bedding.

In the drawings, A is a lounge-frame, of ordinary form, to which is hinged the upholstered bottom B, having the usual head-rest, *a*, and provided with a folding leg, $b^2$, that supports it when open.

To the front edge of the bottom B a front board, C, is hinged. This board is of sufficient width to cover the front edge of the bottom B and also the part of the frame A to which the said bottom is hinged. To the lower edge of the board C are secured the links D, which are hinged to the bottom of the frame A. By this arrangement the board C is carried outward and downward, as shown in Fig. 3, until the bottom B is inverted and in a horizontal position, when the board C will be in the same plane as before, but nearer the floor, and entirely out of the way, so that the bottom B may, when opened, adjoin the frame A.

In the frame A there is a movable frame, F, which rests upon the longitudinal bars *b* of the frame A. Two sliding bars, G, having the right-angled ends *c*, that extend upward across the face of the frame A, are placed parallel with the cross-bars *b'* in guides formed in the frame A.

To each sliding bar G two cams, *e*, are pivoted, which are slotted to receive studs *f*, which project from the bars *b'*. The convex surface of the cams comes in contact with the cross-bars of the movable frame G, and when the bottom B is opened its inner edge presses against the right-angled ends of bars G and moves them inward, so that the cams E are turned on the studs *f*, and the frame F is raised up even with the frame B. When the lounge is closed the bars G, being released, permit the frame F to drop, thus making room for the bedding used in connection with the lounge.

Having thus described my invention, what I claim, and desire to secure by Letters Patent, is—

1. In a bed-lounge, the two halves of the frame hinged together in front, so as to open outward, in combination with a movable frame contained within the rear portion, and so connected with the front or upper half that the movable frame is raised by the opening and lowered by the closing of the lounge, substantially as described.

2. In a bed-lounge, the two halves of the frame hinged together in front, so as to open outward, in combination with a movable front board, which is so hinged to the two parts that the opening of the lounge causes the movable front board to drop down between the two halves of the lounge-frame, and the closing of the lounge lifts the movable front and draws it into place to form a front finish to the two halves of the frame, substantially as described.

3. A bed-lounge having a movable frame contained in the rear portion of the folding frame, and adapted to be raised by opening and lowered by closing the lounge, substantially as described.

4. A bed-lounge having an adjustable finishing front board adapted to be lowered between the folding sections by the opening of the lounge and drawn up again into place by the act of closing the lounge, substantially as described.

5. The movable frame F, sliding bars G, having angle-arm *c*, and cams *e*, in combination with the hinged frame B, as and for the purpose specified.

In witness whereof I have hereunto set my hand this 17th day of October, 1882.

Witnesses: LOUIS W. OTT.

C. P. JACOBS,

MAX RECKER.